(12) United States Patent
Doll et al.

(10) Patent No.: US 11,244,078 B2
(45) Date of Patent: Feb. 8, 2022

(54) SIDE CHANNEL ATTACK PROTECTION

(71) Applicant: NXP USA, Inc., Austin, TX (US)

(72) Inventors: Stefan Doll, Munich (DE); Sandeep Jain, Noida (IN); Vivek Sharma, New Delhi (IN); Dhruv Satsangi, New Delhi (IN); Arnavesh Varun Giri, Ranchi (IN); Ankur Krishna, Noida (IN); Nitin Moudgil, Banga (IN)

(73) Assignee: NXP USA, INC., Austin, TX (US)

( * ) Notice: Subject to any disclaimer, the term of this patent is extended or adjusted under 35 U.S.C. 154(b) by 43 days.

(21) Appl. No.: 16/213,440

(22) Filed: Dec. 7, 2018

(65) Prior Publication Data
US 2020/0184113 A1 Jun. 11, 2020

(51) Int. Cl.
*G06F 21/75* (2013.01)
*G06F 21/79* (2013.01)

(52) U.S. Cl.
CPC ............ *G06F 21/755* (2017.08); *G06F 21/79* (2013.01); *G06F 2221/2123* (2013.01)

(58) Field of Classification Search
CPC ........ G06F 21/79; G06F 21/75; G06F 21/755; G06F 2221/2123
See application file for complete search history.

(56) References Cited

U.S. PATENT DOCUMENTS

| | | | |
|---|---|---|---|
| 5,363,447 A | 11/1994 | Rager et al. | |
| 6,356,555 B1 * | 3/2002 | Rakib | H03M 13/256 370/441 |
| 8,953,790 B2 | 2/2015 | Qi et al. | |
| 9,317,708 B2 | 4/2016 | Lee et al. | |
| 9,755,831 B2 | 9/2017 | Laver et al. | |
| 10,056,937 B1 * | 8/2018 | Neff | H04J 13/0074 |
| 2009/0010424 A1 | 1/2009 | Qi et al. | |
| 2009/0027389 A1 * | 1/2009 | Wakayama | G06T 15/405 345/422 |
| 2009/0113217 A1 | 4/2009 | Dolgunov et al. | |
| 2009/0285155 A1 * | 11/2009 | Scarpa | H04L 27/0008 370/326 |
| 2010/0303239 A1 | 12/2010 | James et al. | |
| 2011/0066835 A1 | 3/2011 | Kothari et al. | |

(Continued)

FOREIGN PATENT DOCUMENTS

WO 2018/125325 A1 7/2018

OTHER PUBLICATIONS

"Adapting semiconductor memory to small machine applications"; RP Billeg Jr—May 1974—shareok.org; pp. 181.*

(Continued)

*Primary Examiner* — Mohammad A Siddiqi

(57) ABSTRACT

A system for securing a secret word during a read of the secret word from a read-only memory (ROM) is disclosed. The system includes a memory controller coupled to the ROM and a random number generator coupled to the memory controller. The random number generator is configured to generate a random number. The system further includes a number shuffler coupled to the random number generator and the memory controller. The number shuffler is configured to generate a bit read order based on the random number and the memory controller is configured to read bits of the secret word from the ROM according to the bit read order.

9 Claims, 1 Drawing Sheet

(56) References Cited

U.S. PATENT DOCUMENTS

| | | | |
|---|---|---|---|
| 2012/0063597 A1* | 3/2012 | Tropp | H04L 9/0861 |
| | | | 380/259 |
| 2012/0204040 A1* | 8/2012 | Schwartz | G06F 21/78 |
| | | | 713/193 |
| 2013/0074145 A1 | 3/2013 | Berenberg et al. | |
| 2014/0164779 A1 | 6/2014 | Hartley et al. | |
| 2014/0241525 A1 | 8/2014 | Deak | |
| 2015/0371063 A1 | 12/2015 | Van Antwerpen et al. | |
| 2016/0173282 A1 | 6/2016 | Circello et al. | |
| 2016/0285635 A1 | 9/2016 | Kolesnikov et al. | |
| 2018/0189493 A1* | 7/2018 | Schilder | G06F 21/74 |
| 2018/0241568 A1* | 8/2018 | Schilder | H04L 9/3242 |
| 2019/0191230 A1* | 6/2019 | Li | H03M 7/46 |
| 2020/0195432 A1 | 6/2020 | Doll et al. | |

OTHER PUBLICATIONS

U.S. Appl. No. 16/220,412, filed Dec. 14, 2018, entitled: Self-Provisioning and Protection of a Secret Key. The Examiner is referred to the copending patent prosecution of the common Applicant (no attachment).

Non-Final Rejection for U.S. Appl. No. 16/220,412, 12 pgs., (dated Dec. 16, 2020).

Final Rejection for U.S. Appl. No. 16/220,412, 13 pgs., dated Apr. 13, 2021.

* cited by examiner

SIDE CHANNEL ATTACK PROTECTION

BACKGROUND

In some semiconductor chips, a secret word is permanently stored in read only memory (ROM) for encryption/decryption of information. Typically, the secret word is stored internally in the chip, hence only the sub-systems inside the chip can read and use the code. However, it is possible to detect the secret word through detection mechanism such as side channel attacks.

A side channel attack is any attack based on information gained from the physical implementation of a cryptosystem, rather than theoretical weaknesses in the algorithms. For example, timing information, power consumption, electromagnetic leaks or even sound can be exploited to derive information about the cryptographic aspects of a system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system for securing a secret word during a read of the secret word from a read-only memory (ROM) is disclosed. The system includes a memory controller coupled to the ROM and a random number generator coupled to the memory controller. The random number generator is configured to generate a random number. The system further includes a number shuffler coupled to the random number generator and the memory controller. The number shuffler is configured to generate a bit read order based on the random number and the memory controller is configured to read bits of the secret word from the ROM according to the bit read order.

In some examples, the memory controller includes a memory register to stored bits of the secret word read from the ROM and the memory controller also includes a secondary memory register to copy pseudo data in between reading actual bits of the secret word from the ROM. The memory controller is configured to invert a bit of the secret code read from the ROM if the bit was stored in an inverted form in the ROM.

In some examples, the reading of the bits is performed in number of read cycles that are greater than a number of bits in the secret word, wherein in one or more read cycles, a pseudo bit is read. In some examples, each bit of the secret word is read a plurality of times, wherein only one read operation in the plurality of reads is an actual read of a bit from the ROM and the remaining read operations in the plurality of reads generate a random data. This is done to hide the read of the actual bit from a side channel attacker.

In another embodiment, a system for securing a secret word during a write operation of the secret word to a read-only memory (ROM) is disclosed. The system includes a memory controller coupled to the ROM and a random number generator coupled to the memory controller. The random number generator is configured to generate a random number and the memory controller is configured to derive the secret word from the random number. The system may further include a number shuffler coupled to the random number generator and the memory controller. The number shuffler is configured to generate a bit write order based on the random number and the memory controller is configured to write bits of the secret word to the ROM according to the bit read order.

In some examples, the writing of the bits is performed in number of write cycles that are greater than a number of bits in the secret word and one or more bits of the secret word are stored in the ROM in inverted form. In some embodiments, each bits of the secret word are attempted to be written to the ROM multiple times, wherein only one of the multiple writes actually writes a data in the ROM.

In yet another embodiment, a method for securing a secret word during a read operation from a read-only memory (ROM) is disclosed. The method includes generating a random number, generating a bit read order using the random number and reading the secret word from the ROM according to the bit read order. The method further includes writing read bits to a first section of a memory register. In one example, in between the writing of the read bits to the first section, writing pseudo bits to a second section of the memory register.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure.

Typically, data written in a read only memory (ROM) may not be altered. In some types of ROMs, to ensure that the data once written cannot be altered, fuses may be used. A fuse box may include a plurality of wires and conductive links and some of the links may be broken. A fuses may also be implemented using semiconductor devices, such as memory cells that can be written only once. A broken link may represent 1 and an intact link may represent 0 or vice versa, for example. Therefore, a plurality of fuses or cells may represent a binary word. The number of fuses or cells in the plurality of fuses or cells may depend on the size of the binary word to be written. For example, an eight bit word will require at least eight fuses or cells. There are other types of ROMs in which data once written cannot be altered. The embodiments described herein are applicable to those types of ROMs as well.

Figure 1:
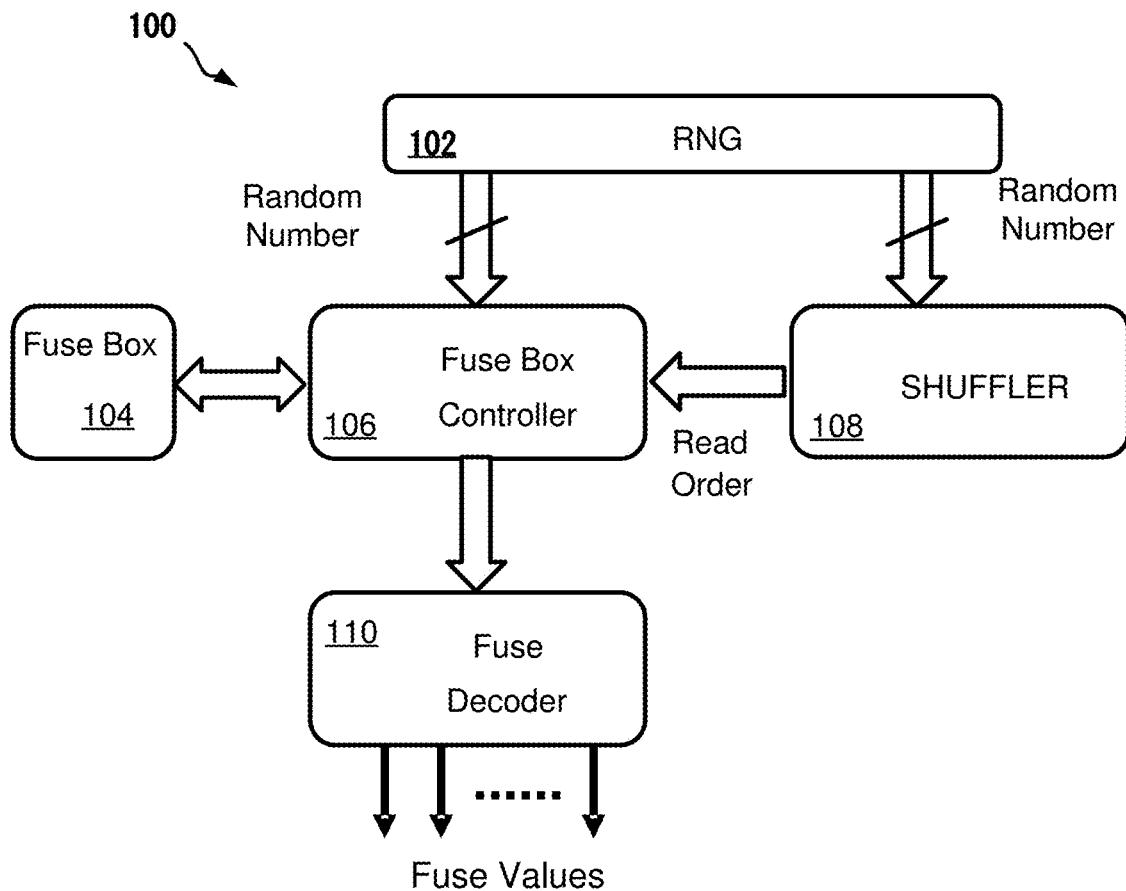
FIG. 1 shows a block diagram of a system for reading/writing a secret word from/to a fuse box securely in accordance with one or more embodiments.
Figure 2:
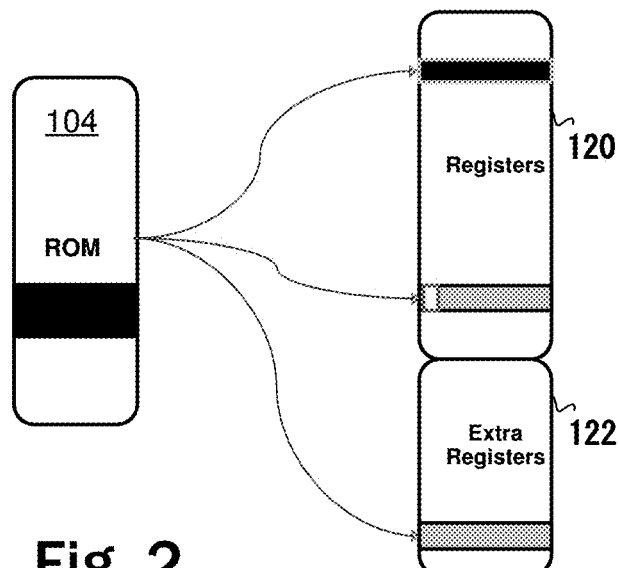
FIG. 2 shows a block diagram to illustrate obfuscation of a secret word when copied to memory registers in accordance with one or more embodiments.

FIG. 1 illustrates a system 100 for reading/writing a binary code to a fuse box 104. The fuse box 104 includes a plurality of conducting links or wires or cells. Each link is coupled to a port such that an external component can establish a conducting path through each link using the two ends of the link. To write a word in the fuse box 104, the external component (e.g., a fuse box controller 106) can send a current above a preselected threshold to "burn" one or more links (or cells in case of other types of ROMs).

A fuse box controller 106 is included to control a secure read and write of data in the fuse box 104. As stated above, the fuse box controller 106 is a memory controller as the embodiments described herein are applicable to other types of ROMs. The term "fuse box" is being used herein merely to indicate that the ROM in question is storage that can be written only once. A random number generator (RNG) 102 is coupled to the fuse box controller 106. The RNG 102 is configured to produce random numbers. In some embodiments, the fuse box controller 106 may provide a random seed number to the RNG 102. The random seed is a number used to initialize a pseudorandom number generator in the RNG 102. In some embodiments the RNG 102 may be inside the fuse box controller 106. A number shuffler 108 may be included to provide a bit read order for reading for reading bits of the secret word. Similarly, when the secret word is being written, the number shuffler 108 provides a random write order. The number shuffler 108 generates a bit read or write order using the random number generated by the RNG 102. In some embodiments, the number shuffler 108 may be included inside the fuse box controller 106. A random read order provides added security because even if a side channel attacker may know individual bit being read, the attacker will not know the read order, hence will not be able to reconstruct the actual secret code. A fuse decoder 110 is included to decode the obfuscated fuse readings into the actual data stored in the fuse box 104. The output of the fuse decoder 110 then may be used by a cryptography sub-system (not shown), for example, to encrypt or decrypt a set of data.

In some embodiments, the fuse box controller 106 may include a current source (not shown) with a variable current output. The current source is used to burn one or more links or cells in the fuse box 104 by sending a high current through a fuse link or cell, high enough to burn the link or cell. When reading the fuse box 104, a low current is passed through each of the fuse links to determine if the link is intact or broken. As indicated above, a broken link may represent 1 and an intact link may represent 0, or vice versa depending on the fuse box controller 106 configuration.

The process of one time writing a secret word in the fuse box 104, in one embodiment, entails generating random data by the RNG 102. In some embodiments, the random data is used as a secret word. In other embodiments, the random data may be converted into a secret word by the fuse box controller 106, for example, through further randomization of the received data to prevent side channel attack when the random data is received from the RNG 102. The number shuffler 108 may provide a random bit write order based on the output of the RNG 102. Hence, for example, the first bit of the secret word is not necessarily written first. According to the output of the number shuffler 108, for example, a secret word 1011 may be written to the fuse box 104 such that the third bit is written first, the first bit is written second and so on. This way a side channel attack will fail to obtain the real secret word.

As discussed above, when the secret word is read from the fuse box 104, the read order is randomized according to the output of the number shuffler 108. In some embodiments, in addition to the random read order, each bit is attempted to be read multiple times, say ten times (for example only). However, out of the ten times, nine times a fake read operation is performed and one time the actual fuse link is read. This way a side channel attacker would fail to capture the real bit read. Further, in some embodiments, when the data read from the fuse box 104 is written to a memory register 120 in the fuse box controller 106 for further operations, an extra register 122 may be used to write noise data to obfuscate writing operations in the memory register. In the example above where each bit was attempted to be read ten times, nine fake reads may be written to the extra register 122 and the read bit is written into the memory register 120. In some examples, after all bits from the fuse box 104 are read, a few more random number of fake read operations may be performed to keep the entire read process time variable. In some examples, instead of reading each bit in the fuse box multiple times, a random number of read cycles are employed for the entire word or secret word in the fuse box 104. The number of read cycles are greater than the number of bits in the word or the secret word stored in the fuse box 104.

Still further, to provide even greater protection, in some examples, some bits of the secret word are inverted when they are stored in the memory register 120. The fuse box controller 104 keeps track of which bits have been inverted. In one example, equal number of bits in the read data are inverted.

Since the RNG 102 will generate a different random number each time and the number shuffler 108 will shuffle the number differently each time, each read will produce a different reading from the fuse box 104. However, the fuse box controller 106 keeps track of the read order and inverted bits. The fuse decoder 110, which, in some embodiments, may be a part of the fuse box controller 106, will use the read tracking information to provide the actual secret word to a cryptography module to enable the cryptography module. As evident, since the secret word itself is self generated internally and is different for each device that uses the system 100, the secret word is not known to external systems.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A semiconductor chip comprising:
   a read-only memory (ROM);
   a memory controller coupled to the ROM and having a first memory register;
   a random number generator coupled to the memory controller, wherein the random number generator is configured to generate a random number;
   a number shuffler coupled to the random number generator and the memory controller, wherein the number shuffler is configured to generate a bit read order based on the random number, wherein:
      the bit read order corresponds to a non-sequential order of the bits of a secret word stored in the ROM;
      the memory controller is configured to read the bits of the secret word from the ROM according to the bit read order and store the read bits as a copy of the secret word into the first storage register using the bit read order; and
      the memory controller is configured to perform the reading of the bits of the secret word in a number of read cycles that is greater than the number of bits in the secret word, wherein, in one or more read cycles, the memory controller is configured to read at least one pseudo bit in between reading two bits of the secret word.

2. The semiconductor chip of claim 1, wherein:
   the memory controller includes a secondary memory register; and
   the memory controller is configured to copy pseudo data into the secondary memory register in between copying at least two bits of the secret word from the ROM into the first memory register.

3. The semiconductor chip of claim 1, wherein the memory controller is configured to invert a bit of the secret code read from the ROM if the bit was stored in an inverted form in the ROM.

4. The semiconductor chip of claim 1, wherein the memory controller is configured to read at least one bit of the secret word a plurality of times, wherein only one read operation in the plurality of reads is used to store a corresponding bit of the copy of the secret word into the first storage register.

5. A semiconductor chip comprising:
   a ROM;
   a memory controller coupled to the ROM;
   a random number generator coupled to the memory controller, wherein the random number generator is configured to generate a random number; and
   a number shuffler coupled to the random number generator and the memory controller, wherein the number shuffler is configured to generate a bit write order based on the random number, wherein the memory controller is configured to write bits of a secret word into the ROM according to the bit write order, wherein the bit write order corresponds to a non-sequential order of the bits of the secret word, wherein the memory controller is configured to perform the writing of the bits of the secret word in a number of write cycles that is greater than the number of bits in the secret word.

6. The semiconductor chip of claim 5, wherein the memory controller is configured to store one or more bits of the secret word in the ROM in inverted form.

7. The semiconductor chip of claim 5, wherein the memory controller is configured to attempt to write at least one bit of the secret word to the ROM multiple times, wherein only one of the multiple writes actually writes the bit of the secret word in the ROM.

8. A method for securing a secret word during a read operation from a read-only memory (ROM) in a semiconductor chip, the method comprising:
   generating a random number internal to the semiconductor chip;
   generating a bit read order using the random number internal to the semiconductor chip;
   reading the secret word from the ROM according to the bit read order internal to the semiconductor chip;
   writing read bits to a first section of a memory register internal to the semiconductor chip, wherein the bit read order corresponds to a non-sequential order of the bits of the secret word; and
   writing one or more pseudo bits to a second section of the memory register in between writing two read bits of the secret word to the first section such that a number of read cycles to read the secret word from the ROM is greater than the number of bits in the secret word.

9. The method of claim 8, further including inverting a bit of the secret code read from the ROM internal to the semiconductor chip if the bit was stored in an inverted form in the ROM.

* * * * *